United States Patent
Brugman et al.

(10) Patent No.: US 8,180,023 B2
(45) Date of Patent: May 15, 2012

(54) METHOD AND APPARATUS FOR REPLACEMENT CONNECTION VERIFICATION DURING MIGRATION FROM AN ANALOG NETWORK ELEMENT TO A NEXT GENERATION NETWORK ELEMENT

(75) Inventors: David LeRoy Brugman, San Clemente, CA (US); Dennis W Capecci, Finksburg, MD (US)

(73) Assignee: Alcatel Lucent, Paris (FR)

( * ) Notice: Subject to any disclaimer, the term of this patent is extended or adjusted under 35 U.S.C. 154(b) by 866 days.

(21) Appl. No.: 12/290,554

(22) Filed: Oct. 31, 2008

(65) Prior Publication Data

US 2010/0111268 A1 May 6, 2010

(51) Int. Cl.
*H04M 1/24* (2006.01)
*H04M 3/08* (2006.01)
*H04M 3/22* (2006.01)

(52) U.S. Cl. ............... 379/27.01; 379/29.01; 379/29.03; 379/29.05

(58) Field of Classification Search .................. 379/1.01, 379/1.04, 9, 10.01, 12, 14.01, 15.01, 15.03, 379/22, 23, 24, 27.01, 29.01, 29.03, 29.04, 379/29.05, 29.11, 30; 370/241, 242, 248, 370/251

See application file for complete search history.

(56) References Cited

U.S. PATENT DOCUMENTS

| | | | | |
|---|---|---|---|---|
| 5,712,897 A | * | 1/1998 | Ortel | 379/22 |
| 5,764,726 A | * | 6/1998 | Selig et al. | 379/21 |
| 5,790,634 A | * | 8/1998 | Kinser et al. | 379/29.01 |
| 5,850,426 A | * | 12/1998 | Watkins et al. | 379/29.01 |
| 5,923,729 A | * | 7/1999 | Dezonno | 379/15.01 |
| 7,027,405 B1 | * | 4/2006 | Khadavi | 370/244 |

FOREIGN PATENT DOCUMENTS

| | | |
|---|---|---|
| WO | WO2008104732 A1 | 9/2008 |
| WO | WO2009151510 A1 | 12/2009 |
| WO | PCT/US2009/005616 | 2/2010 |

\* cited by examiner

*Primary Examiner* — Binh Tieu
(74) *Attorney, Agent, or Firm* — D. M. La Bruno

(57) ABSTRACT

Method, corresponding apparatus and system are provided for transparently testing replacement functionality and optionally migrating subscribers on analog phone lines, served, for example, by PSTN Class 5 elements, to Next Generation Network (NGN) elements when copper co-termination is leveraged. According to an exemplary method, a telephone line for a telephone number is accessed through a metallic test access circuit of an analog network element and it is determined if the telephone line is available to test. If the telephone line is available to test, a port of a Next Generation Network element corresponding to the telephone number is activated, and it is determined whether a copper connection to the port of the Next Generation Network element is operating properly based on a voltage level received through the analog network element.

20 Claims, 3 Drawing Sheets

METHOD AND APPARATUS FOR REPLACEMENT CONNECTION VERIFICATION DURING MIGRATION FROM AN ANALOG NETWORK ELEMENT TO A NEXT GENERATION NETWORK ELEMENT

FIELD OF THE INVENTION

The invention relates to a method and apparatus for testing new copper connections while migrating lines from an analog system, such as a Public Switched Telephone Network (PSTN), to a Next Generation Network (NGN) system, such as a Voice Over Internet Protocol (VoIP) system.

BACKGROUND INFORMATION

While the methods and apparatuses disclosed are particularly described with respect to the art of connection verification in line migrations from, for example, PSTN to VoIP networks, and will be thus described with specific reference thereto, it will be appreciated that the invention may have usefulness in other fields and applications. For example, the invention may be used in other types of line migrations where copper lines are available.

When migrating a telephone line from an analog switch, such as a class 5 PSTN switch, to a NGN element, such as a VoIP network element, a replacement copper wire connection is established between the NGN element and the analog telephone. Present methods do not allow for appropriate testing of the new copper connection that is created during such a line migration process.

In analog to analog conversions, testing of replacement copper connections is available, and is referred to as "Board To Board" testing. In an analog to analog conversion, both lines are analog connections and so are accessed individually via a metallic access circuit on each Class 5 switch. The analog metallic access circuit, commonly referred to as the "Local Test Distributor", provides copper testing access to the Class 5 line port under test. First, the metallic access circuits are connected to the same telephone number on the source switch and the replacement switch. Then, both metallic access circuits are connected to an apparatus that passes tones or continuity tests over the existing wiring to the co-terminated (usually a Main Distribution Frame double connection) replacement wiring in order to verify common copper connectivity to the line that will be moved to the replacement analog switch.

This conventional method of testing is not possible when migrating lines between analog switches and replacement NGN elements because NGN elements do not have metallic access circuitry. No other suitable method for this test is available.

In this regard, PSTN to NGN line migrations currently require moving each line connection from the PSTN to the NGN element, and then performing a manual test. This process is not suitable for a variety of reasons. For example, if the copper verification test fails, restoring the NGN port to its previous state would be very difficult and time consuming because a back out procedure is required. Current methods do not provide such a back out procedure. In addition, when a manual Class 5 switch to NGN migration fails, manual repair and restoration in real time of the system to its previous state is required.

An alternative wiring continuity test is known. However, this alternative test is likewise insufficient. For example, this alternative test does not include tests to the actual replacement NGN dial tone port.

SUMMARY OF THE INVENTION

A method and apparatus for new copper connection verification during Public Switched Telephone Network (PSTN) to Voice over Internet Protocol (VoIP) line migrations are provided.

In one embodiment, a method comprises accessing a telephone line for a given telephone number through a metallic test access circuit of an analog network element, determining if the telephone line is available to test, activating a matching port of a Next Generation Network (NGN) element corresponding to the same telephone number if the telephone line is available to test, and determining whether a copper connection to the port of the NGN element is operating properly based on a voltage level received through the analog network element.

In other embodiments, the method further includes determining the telephone number for a telephone line to be tested and extracting the telephone number from a work list.

In another embodiment, accessing a telephone line for a telephone number through a metallic test access circuit includes instructing the metallic test access circuit to enter bypass mode.

In one embodiment, the determining if the telephone line is available includes detecting whether the line has voice or tone frequencies thereon.

In another embodiment, a telephone line for a second telephone number is accessed through the metallic test access circuit of the analog network element for testing of the second telephone line.

In a further embodiment, the telephone line of the analog network element and a port of a Digital Subscriber Line Access Multiplexer (DSLAM) associated with the telephone line are de-activated if the replacement copper connection is determined to be operating properly In other embodiments, the analog network may be a PSTN, the analog network element may be a Class 5 switch, and the NGN element may be a VoIP element.

In another embodiment, an apparatus includes a metallic test access interface for accessing a telephone line for a telephone number through a metallic test access circuit of an analog network element, the analog network element serving an analog network; a detection module for determining if the telephone line is available to test; a first activation module for activating a port of a NGN element corresponding to the telephone number if the telephone line is available to test; and an evaluation module for determining whether a copper connection between the port of the NGN element and the analog telephone is operating properly based on a voltage level received through the analog network element.

In other embodiments, the apparatus includes a selection module for determining the telephone number for a telephone line to be tested and a selection module for extracting the telephone number from a work list.

The metallic test access interface is adapted to instruct the metallic test access circuit to enter bypass mode in one embodiment and the detection module is adapted to detect whether the telephone line has voice or tone frequencies thereon in another. In another embodiment, the apparatus includes a second activation module adapted to de-activate the telephone line of the analog network element if the replacement copper connection is determined to be operating.

In various embodiments, the analog network may be a PSTN, analog network element may be a Class 5 switch and the NGN element may be a VoIP element.

In another embodiment, a system comprises an analog network element for serving a telephone number and a corresponding telephone line in an analog network; a NGN element for serving the telephone number and the corresponding telephone line; a copper connection between the corresponding telephone line and a port of the NGN element; and a control element adapted to verify the copper connection by activating the port of the NGN element and determining whether the copper connection is operating properly based on a voltage level received through the analog network element.

In further system embodiments, the control element may be adapted to determine if the telephone line is available to test, activate the port of the NGN element that corresponds to the telephone number if the telephone line is available to test, and de-activate the analog network element if the replacement copper connection is determined to be operating properly.

In another embodiment, all of the software steps required for line co-termination testing and NGN port activation that is coordinated for a Class 5 to NGN line migration are mechanized.

In another embodiment, mechanization steps and interfaces for all network elements are provided on a single device.

In another embodiment, processing of the line migration is based on a web portal request to the apparatus that delivers the software changes to the network elements. That request may be validated in a further embodiment.

In another embodiment, a statistical report for copper verification tests and optional line migration activity is generated. These reports may be generated as the activity to be reported occurs.

In another embodiment, support system and routing database changes are delivered concurrent with line migration.

Further scope of the applicability of the present invention will become apparent from the detailed description provided below. It should be understood, however, that the detailed description and specific examples, while indicating embodiments of the invention, are given by way of illustration only, since various changes and modifications within the spirit and scope of the invention will become apparent to those skilled in the art.

DESCRIPTION OF THE DRAWINGS

Example embodiments will become more fully understood from the detailed description given below and the accompanying drawings, which are given by way of illustration only and thus are not limiting of the invention, and wherein.

DETAILED DESCRIPTION

Figure 1:
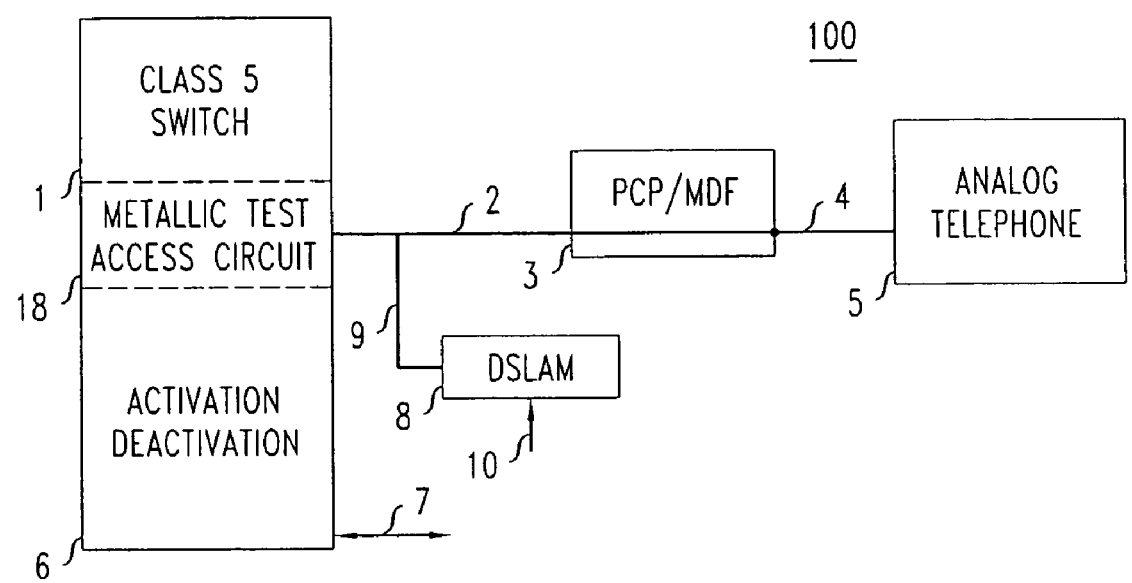
FIG. 1 is a representative block diagram illustrating a system into which the described embodiments may be incorporated and the connectivity of an analog telephone prior to its migration to an Next Generation Network (NGN)

The described exemplary embodiments relate to a method and apparatus for testing new copper co-terminations disposed between an analog network element, such as a Public Switched Telephone Network (PSTN) Class 5 switch and other analog network elements, and a Next Generation Network (NGN) element, such as a Multi-Service Access Node (MSAN) and an Intelligent Services Access Manager (ISAM). The contemplated testing of exemplary embodiments is accomplished during analog line to Voice over Internet Protocol (VoIP) line migration.

As used herein, the term "and" is used in both the conjunctive (i.e., item X and item Y) and disjunctive (i.e., X or Y) senses and includes any and all combinations of one or more of the associated listed items. The singular forms "a", "an" and "the" are intended to include the plural forms as well, unless the context clearly indicates otherwise. It will be further understood that the terms "comprises", "comprising,", "includes" and "including", when used herein, specify the presence of stated features, integers, steps, operations, elements, and components, but do not preclude the presence or addition of one or more other features, integers, steps, operations, elements, components, and groups thereof.

The described embodiments correlate all of the software tools needed to test the replacement copper connections for a line that will be migrated from an analog Class 5 element to a replacement NGN Internet Protocol (IP) based element. User requests relating to lines for testing are brokered into specific network element input/s and data for testing of the new copper connection. NGN line port status change responses are recovered. Optionally, the described embodiments migrate the line to the NGN switch or element by evolving both the Class 5 switch or element and NGN line provisioning status, and enabling and disabling ports as required. It should also be noted that in some alternative implementations, the functions/acts of the described method may occur out of the order noted in the figures. For example, two figures shown in succession may in fact be executed substantially concurrently or may sometimes be executed in the reverse order, depending upon the functionality/acts involved.

The described embodiments provide a previously unavailable method for NGN line software and wiring provisioning verification for migrating from an analog element, such as the noted Class 5 switch or other analog element, to a new NGN element over a new copper connection. The provided capability ensures minimal service interruption when a line is migrated to the NGN network from the analog network. A control computer verifies the new copper connection and, optionally, completes the migration of the line to the NGN element when the copper verification connection tests are completed satisfactorily.

In at least one embodiment, test/s required for connection verification in all network elements are mechanized or automated to occur sequentially. In another embodiment, each test or set of tests is requested via a Control Computer (CC). Further, the CC may receive requests, for example, directly via keyboard and mouse from an end user, and through an optional Internet Web based requests from the end user. Status messages concerning the testing and migration process may also be provided to the user through CC terminal responses. For example, a user may be informed by screen displays and printed reports.

The CC may be operative to communicate with each network element in the native protocol and using native commands and responses of the respective analog and NGN element. Also, the CC may log some portion or all activity undertaken and provide mechanized statistical reporting. Optionally, the control computer may also have connectivity to any support system database that may require changes as the result of a copper line verification test and optional line migration to the NGN network element. The CC may also test the NGN element's respective port to validate that the proper provisioning transactions have occurred on the NGN element.

Referring now to the drawings which are for illustrating exemplary embodiments only and not for purposes of limiting the claimed subject matter, FIG. 1 provides a view of a system 100 into which the described embodiments may be incorporated. FIG. 1 illustrates connectivity of an exemplary system 100 before line migration and before copper connectivity is established between the analog system and an NGN element.

As shown, Element 1 represents an analog switch such as a Class 5 Switch that serves telephone subscribers on a PSTN before migration to a NGN. Switch 1 includes a metallic test access circuit 18. Link 2 represents the analog dial tone connection from the switch 1 through a local existing copper facility to a Primary Connection Point (PCP) 3, typically a street cabinet that is placed near the telephone subscribers.

The street cabinet provides wiring flexibility for connection of the local copper cable from a Central Office to the copper wiring associated with subscriber premises. The existing subscriber interface at the PCP 3 can be removed after the conversion/migration has been completed since its functionality will be replaced by a NGN technology like a MSAM or ISAM. The PCP 3 usually will not be reused after line migration, but in some instance, the PCP may be retained to provide wiring flexibility.

Alternately, link 2 represents the analog dial tone connection from the Class 5 Switch to the Main Distribution Frame (MDF) in a Central Office. Thus, element 3 alternately represents the corresponding MDF in a Central Office. The MDF provides wiring flexibility for connection of the analog switch or NGN element dial tone port to a subscriber's local copper cable. An MDF typically will be reused after line migration.

Element 4 represents a local copper loop to a subscriber premises. Element 5 represents the subscriber premises and an analog telephone at the subscriber premises that is in use before line migration. Both the local loop and subscriber premises equipment will be reused after line migration.

Element 6 represents provisioning software that may used to activate and deactivate a Class 5 telephone line. Provisioning software may be co-located with the switch as shown or may be otherwise located and connected to the switch. Link 7 represents electronic connection to the provisioning software capability of the Class 5 Switch, thereby enabling remote interface with the provisioning software. Element 8 represents a Digital Subscriber Line Access Multiplexer (DSLAM). The DSLAM provides broadband access for the analog line through connection 9 to switch 1, via switch 1 to PCP/MDF element 3 and local cooper link 4 to subscriber premises 5.

Link 9 represents the copper connection from the optionally assigned DSLAM port to the subscriber's local loop. Link 10 represents a provisioning interface for the DSLAM.

To migrate a telephone line from a switch 1 to a replacement NGN element (not shown), a copper connection (not shown) is established between the analog or PSTN network and the NGN network. As noted above, it will be appreciated that current techniques do not allow for the suitable testing of this new copper connection.

Figure 2:
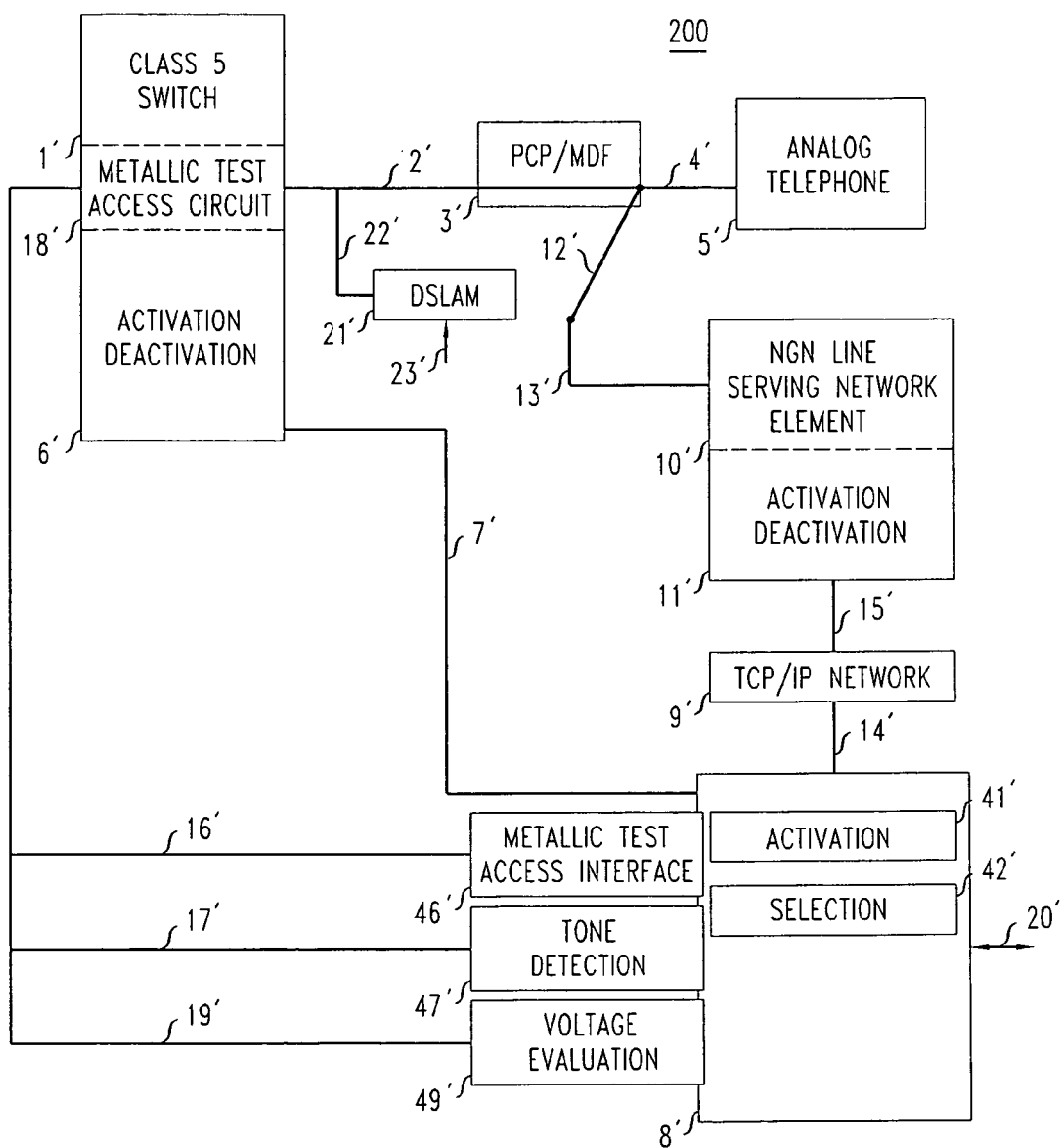
FIG. 2 is a representative block diagram illustrating connectivity of a system including an analog telephone and a control computer for replacement connection verification during line migration of the analog telephone to an NGN.

Referring now to FIG. 2, an exemplary system 200 illustrating an implementation for the connectivity verification of an analog telephone during line migration to a Next Generation IP network—which includes the placement of a control computer 8' into the system 200 during the copper verification and line migration process—is shown. The control computer 8' need only be active in the network during a defined transition period. Thus, the control computer is not typically a permanent network element. Nevertheless, the control computer may be a permanent element in the system.

In FIG. 2, an analog switch 1', such as a Class 5 switch that serves telephone subscribers on the PSTN, is shown. Switch 1' includes a metallic test access circuit 18'. It should be understood that other analog elements may also be included in addition to or as a replacement for the switch 1' in a network into which the exemplary embodiments are implemented.

Link 2' represents the analog dial tone connection from the switch 1' through the local existing copper facility to the Primary Connection Point (PCP) 3', a street cabinet typically placed in proximity to telephone subscribers. The PCP cabinet provides wiring flexibility for connection of the local copper cable from the Central Office to the copper wiring at a subscriber premises. The existing subscriber interface at the PCP can be removed after the conversion and migration process has been completed, with the PCP replaced by a NGN technology like a MSAM or ISAM.

Link 2' alternately represents the analog dial tone connection from the switch 1' to a Main Distribution Frame (MDF) of a Central office with element 3' alternately representing the MDF. The MDF provides wiring flexibility for connection of the analog switch and an NGN element dial tone port to the subscriber's local copper cable. Typically, the MDF will be reused after connection migration.

Local copper loop 4' connects the PCP/MDF to a subscriber premises. Element 5' represents subscriber premises and the analog telephone in use at the subscriber premises before line migration. Both of these elements will be reused after line migration.

Provisioning software 6' is used to provision the Class 5 switch including being used to activate and deactivate the Class 5 line under test. The provisioning software may be co-located with the switch 1' as shown or may be otherwise located and associated and placed in communication with the switch. Link 7' represents an electronic connection to the provisioning software support system interface between the Class 5 Switch 1' and Control Computer (CC) 8'. Activation module 41' provides an interface at the CC to the provisioning software of the Class 5 Switch.

As noted above, the CC 8' is provided in the system for verifying replacement connections during migrations from an analog network element to a NGN element. It will be understood that Activation 41', Selection 42', Metallic Test Access Interface 46', Tone Detection 47' and Voltage Evaluation 49' modules are a part of or integrated with the CC 8'. Selection module 42' provides in various embodiments, an interface and circuitry for determining a telephone number for a telephone line to be tested, and storing and extracting a telephone number from a Work List.

The CC may take a variety of forms to achieve the objectives of the described embodiments—including forms having a variety of hardware configurations and software implementations. Functions described with respect to the described method are readily carried out by special or general purpose digital information processing devices acting under appropriate instructions embodied, e.g., in software, firmware, circuitry or hardware programming. For example, functional modules of the control computer may be implemented as an ASIC (Application Specific Integrated Circuit) constructed with semiconductor technology and may also be implemented with FPGA (Field Programmable Gate Arrays) or any other hardware blocks.

In at least one embodiment, telecommunications provisioning capabilities, network access capabilities, software mapping and software back out tools are centralized on the CC 8'. In one embodiment, the CC 8' may be placed physically near the metallic test access circuitry 18' of the switch 1' though it need not be co-located. The CC 8' is operative to control the metallic test access circuit of the switch 1' by stimulating the correct voltage potentials and transmitting multi-frequency signals to the circuit via metallic test access interface 46'. The CC 8' also has connectivity on the network segment that has access to the associated Class 5 switch, NGN element and DSLAM provisioning interfaces.

User access to the CC 8' may be accomplished through input devices such as keyboard and mouse. The control computer may also be accessed optionally via an Internet Web Based request. Further, the CC may provide a console display or web page to a user for associating all testing and migration results. When the end user requests one or a set of copper verifications and migrations, the CC may automatically issue console or web page updates and visual indications that direct and inform the end user of results of the testing and optional migration process.

Transmission Control Protocol/Internet Protocol (TCP/IP) network 9' is used to monitor and provision the NGN element for the line/s under test. Element 10' represents the NGN line serving element (e.g., an MSAN or ISAM via Soft Switch control). NGN provisioning software 11' is used to activate and deactivate a NGN line.

Link 12' represents the new copper co-termination between the subscriber's loop and the NGN dial tone port. It is typically co-terminated with the Class 5 tip and ring at the local cable pair on the MDF 3' or the subscriber's loop at the PCP 3'. Link 13' represents the connection to the dial tone port on the NGN element.

Link 14' represents the TCP/IP Network connection to the CC and may be used for communication between the activation module 41' of the CC and NGN element for provisioning activities such as activation and deactivation. Link 15' represents the TCP/IP network 9' connection to the NGN dial tone port Activation/Deactivation provisioning software capability 11'. Connection of the CC 8' to this link is available through link 14' and TCP/IP network 9'.

Link 16' represents the connection between the metallic test access interface 46' of the CC 8' and the Class 5 Switch metallic test access circuit 18' which directly controls the metallic test access trunk resident as part of the Class 5 Switch. Control exhibited over this connection 16' enables exclusive access to the subscriber line under test. Once this connection is established and the analog line is available for test, the metallic test access circuit 18' is placed in a bypass mode; links 17' and 19' have access to the subscriber line parallel to that of link 16'. In the bypass mode, the analog line talk voltage is removed and call initiating access to the line under test via the switch is otherwise prevented. Accordingly, the CC 8' will have exclusive access to the tip and ring wiring of the line under test through the analog line port to the tip and ring wiring, link 2.

Tone detection module 47' is connected to metallic test access circuit via link 17'. The tone detection module detects progress tones on some types of metallic test access circuitry. For example, the tone detection may detect basic tones one would hear as the telephone is used, such as for example, dial, busy and number unobtainable tones from the metallic access circuitries' programmed responses. Element 18' represents the metallic test access circuit and the associated metallic access trunk embedded in the Class 5 switch.

As explained further below, Voltage Evaluation module 49' is used to verify the NGN line port activation via link 19', metallic test access circuit 18', link 2', PCP/MDF 3', link 12 and link 13. A predetermined voltage level over the link from the metallic test access circuit indicates that the NGN line port under test has been properly activated and verifies continuity over the copper connection 12' to the correct NGN port. Voltage Evaluation module may also be used to determine whether the line to be tested is in use prior to test (i.e., busy), and whether there is a metallic access multi-frequency start dial signal (wink), metallic access cut-through or metallic access circuitry hardware failure during the access process.

Link 20' represents a connection to support system database update mechanisms, for example for the purpose of updating the CC regarding lines for testing and migration and reporting the results of such efforts. For example, this link can be informational on a TCP/IP internal network (e.g., a service provider internal network) and a TCP/IP port that can deliver the information through electronic processes such as email or File Transfer Protocol. The CC 8' may also be accessed remotely via this link.

DSLAM 21' provides broadband access for the analog line through link 22', link 2', PCP/MDF 3' and link 4'. Link 22' represents a copper connection from the optionally assigned DSLAM port to the subscriber's local loop. Link 23' represents a provisioning interface for the DSLAM.

In operation, a Telephone Number (TN) under test is accessed in the switch 1' via the metallic access circuit under the control of the metallic test access interface 46' of the CC 8'. Use of the subscriber line will be detected over link 19 as a voltage presence which will cause tests to be delayed. For instance, if a subscriber is using the line, tests are deferred. If the subscriber is not using the line (e.g., there is no voltage presence on Link 19), the metallic test access circuit is placed in a bypass mode. The bypass mode removes the analog port talk battery so at this point the circuit is considered "dry". In the bypass mode, the CC 8' is provided exclusive access to the tip and ring wiring of the line under test through the analog switch dial tone port to Link 2. Since the metallic access circuitry in part of the TDM switch, calls to the line under test are diverted under switch program control. The CC 8' may now operate a tone detection circuit 47' to determine the presence of metallic access error progression tones. In some instances the tone detection circuitry can also be used to detect subscriber activity.

The CC 8' may also operate a voltage evaluation circuit 49' to determine the busy/idle status of the line. For example, the busy/idle status of the line may be determined via voltage detection and evaluation. If the line is busy (e.g., a voltage split is detected or the line otherwise determined busy), the line is flagged for retest later, and the test trunk is reset for the next line under test. If the line is idle (e.g., no voltage detected on the line), the test process proceeds under program control of the CC. At this point, the NGN dial tone port already has been co-terminated to the tip and ring path of the Class 5 switch dial tone port, usually at the local cable and pair that serves the subscriber line that will be migrated. In addition, the NGN element has the corresponding line port in an out of service state or the dial tone in a suspended state. Subsequently, there is no voltage potential or dial tone on the NGN port.

On the Class 5 switch side, dial tone and voltage potential have been disabled as a function of the seizure by the metallic test access circuit. The NGN port of NGN element 13' that corresponds to the line under test is now enabled by the CC 8' via an activation module 41' control message that is provided across the TCP/IP network 9'. Once the NGN activation response ahs been returned the CC 8' waits for voltage to be returned from the NGN port via the Voltage Evaluation circuit 49'. If a predetermined voltage is not returned by the NGN port in the allotted time, the TN is flagged as an error condition and the trunk is reset for the next line under test. The next line under test is determined by Selection module 42'. If the predetermined voltage is returned by the NGN port, the test proceeds under program control.

Once the predetermined voltage has been detected at the CC by the Voltage Evaluation circuit, the CC determines that the NGN port has been provisioned properly because the NGN port needs to register with a Soft Switch (typically the Application Server) controlling the NGN element before voltage is programmatically placed on the NGN port. The voltage test described determines whether the replacement wiring is correct and the NGN port has been provisioned properly. The replacement wiring, the NGN port, and NGN provisioning status have been completely tested and the NGN line is now available for service.

At this point, if line migration is desired, the Class 5 line can be disabled and the TN from the PSTN perspective can be rerouted to the NGN by the CC through the use standard input messages to the Class 5 Switch. If the line under test/migration is wired to a DSLAM, the DSLSM port also may be disabled by the CC. The migration at this point would be complete. If migration is not desired at this time, the CC merely returns the NGN port to its previous disabled state via control messages and releases the metallic access circuit after the proper NGN response has been detected. As a result of the described process, the risk of migrating a line not co-terminated to a properly provisioned NGN line port has been eliminated. If line by line migration were desired and connection verification failed, restoring the NGN port to its previous disabled state provides a simple back out procedure. In contrast, current line migration methods do not have an automated back out procedure. Currently, when a manual Class 5 Switch to NGN migration fails, a manual repair in real time is required.

Figure 3:
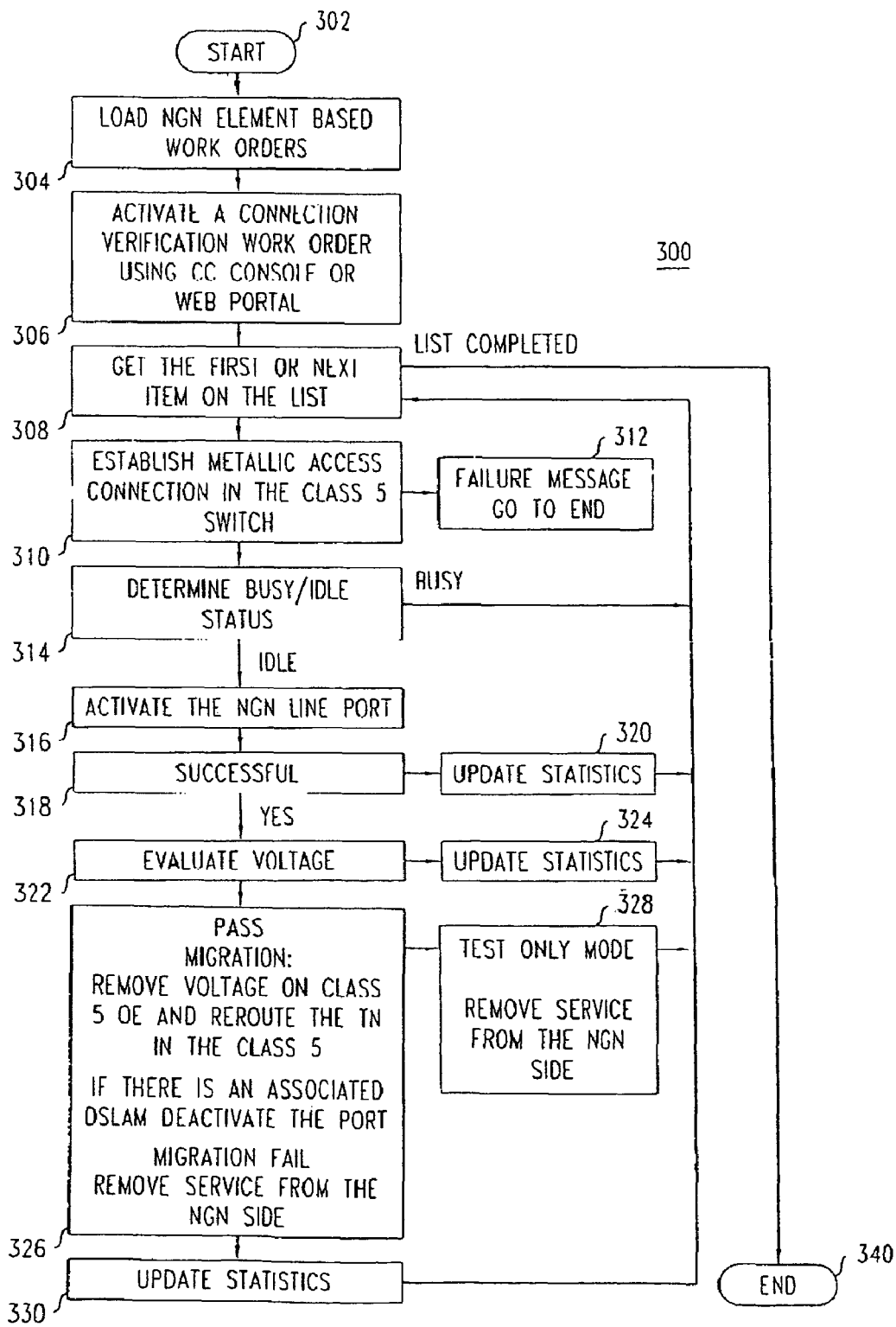
FIG. 3 is a flow chart illustrating an exemplary method for replacement connection verification during line migration from an analog network element to a NGN.

With reference now to FIG. 3, an exemplary method 300 representing a line testing and migration operation for the described embodiments is shown. It should be appreciated that the method 300 may be implemented in a variety of different manners. For example, a variety of different hardware configurations and software techniques may be used to implement the method. In one form, such software routines are primarily controlled and run on the CC 8'. In other forms, the software routines may be distributed throughout the network on various hardware elements. In still other forms, hardware configurations may be used to implement the described embodiments. In still other forms, combinations of these approaches may be implemented.

In the illustrated exemplary embodiment, it will be understood that the method is started at 302 when the co-terminations and NGN element are believed properly installed and ready for testing. At 304, NGN element based Work Orders are loaded after receipt of an end user request for an individual line test or a set of line tests. For example, an end user may input a line to be tested and request a line test through selection of menu choices displayed on a computer screen of the CC 8'. The CC may be accessed directly using keyboard and mouse but also may be controlled remotely using a Web browser and the TCP/IP network such that line test requests may be received from remote locations.

Test sets will also be referred to as Work Orders. In one embodiment, Work Orders are text files that are placed on the CC 8', for example in a predefined folder from which they are loaded for testing when the co-terminations and NGN element are ready for test. Work Orders are NGN element based. Key fields in the Work Order include the TN to be tested and the NGN port to be activated. A Work Order may include any number of entries, identifying from one line to a number of lines to be migrated to the NGN element.

At 306, connection verification for a Work Order is initiated. The Work Order may be activated as a Test Only or a Test and Migrate process. For example, when the copper verification program is running on the CC 8', a window with a list of valid Work Orders may be displayed. The end user may select a Work Order from the on screen list and activate that Work Order as a Test Only or Test and Migrate process.

From this point forward, the CC 8' mechanizes or automates all processes. At 308, the CC 8' extracts the first entry in the Work Order. The TN to test and the NGN port to activate will be embedded in the Work Order entry in one embodiment. Again, the TN is a key field in the entry. Normally, this TN will be the same number for both the analog or Class 5 and the NGN element. If no items remain for processing, the process is ended at 340. However, if an item on the Work Order is to be processed, the CC 8' via the metallic test access interface accesses the number on the Work List entry using the Class 5 metallic access circuit at 310. The CC controls the Class 5 switch metallic test access circuitry by applying specific serial port commands to the metallic access interface in order to achieve proper control voltage potentials and transmitting multi-frequency signals to the circuit to access the line on the Work Order. If the line cannot be accessed, a failure message is provided and the process is ended at 312.

If the line is accessed (i.e, the line is not in use and there was no metallic access circuit failure), the metallic access circuit is placed in the bypass mode where testing for line status is conducted at 314. In this mode, the CC will be able to "listen" to the copper co-termination for tone activity using the tone detection circuit. The tone detection circuit on the CC 8' will activate if a voice frequency or metallic test access progress tone indicators are detected. If voice frequency is detected, the line is considered improperly co-terminated and the CC 8' proceeds to the next entry on the Work Order at 308. Likewise, if a progress tone indicator is detected, the line is considered improperly co-terminated and the CC 8' proceeds to the next entry on the Work Order at 308. The Voltage Evaluation circuitry may also be used to determine line availability. If the Voltage Evaluation circuitry determines that talk voltage is split, the line is deemed in use (i.e. busy) and the CC 8' proceeds to the next entry on the Work Order at 308.

On the other hand, if the Voltage Evaluation circuitry determines that no voltage is present and there is no tone activity, the line is deemed available for test (i.e. idle). In some PSTN switch types, line availability can also be determined by evaluating serial port information from the associated metallic test access circuitry. When idle, dial tone and incoming calls are blocked from the Class 5 side of the connection as a function of the metallic test access circuit invocation of the bypass mode.

If the line is available for test, the CC 8' via the activation module activates with an administrative and provisioning message at 316 the port of the NGN dial tone serving element that corresponds to the telephone number under test in the Class 5 element. The NGN port may be activated using the TN or the NGN port identified from the Work Order entry depending on the NGN Element being deployed. The CC 8' then waits for successful completion of the NGN activation at 318. If the NGN activation is not successfully completed, the TN is flagged for an error condition at 320 and the process loops for the next line under test at 308. After NGN activation is deemed successfully completed, the CC 8' evaluates the voltage level on link 19; the CC 8' waits for talk voltage (i.e., a predetermined voltage level) from the port of the NGN element on link 19' at 322. Voltage returned in the expected time frame indicates that the NGN port has registered with the Soft Switch Application Server and is in service over the proper cable and pair. Moreover, receipt of the proper voltage level indicates the NGN dial tone port has been tested for proper functionality with continuity over the copper connection to the correct NGN port verified. The NGN line is now in service. If the proper voltage level was not returned by the NGN port in the allotted time, the TN is flagged for an error condition and the connection is reset for the next line under test at 324. Thus, 324 is reached when the line was successfully activated in the NGN because the correct response was received over link 14' but, the proper voltage level was not returned over link 19'. This may indicate a wiring error or provisioning error, such as the port on the jumper running list not matching the port provisioned in the NGN element. If the voltage test fails, service is removed from the NGN side.

At 326, if the voltage level test was successful and a Test and Migration process is being performed, the line is deactivated in the analog or Class 5 Switch and the TDM intra-switch routing is changed by the CC 8' over the Class 5 Switch provisioning interface. If the line under test and migration is wired to a DSLAM, the DSLAM port is also disabled by the CC 8' at 326. If the Class 5 line or TDM deactivation process fails (i.e., Migration Fails), prior provisioning of the Class 5 Switch and DSLAM are restored and the NGN is deactivated at 326. Program control then passes to 330 for update of relevant statistics and the process is returned to 308. If a Test Only process is being performed, program control passes from 326 to 328, and the NGN service is removed by the CC 8'. Relevant statistics may also be updated at 328 and prior to the process returning to 308. Thus, this set of actions is repeated for each item on the Work Order.

Data for the generation of relevant statistic is stored in a data file, in one form. The data captured can be displayed by the CC 8' and the resultant data file may also be evaluated for expected results.

The method and apparatus described beneficially enables:
  scheduled testing and optional migration, for example scheduling by an end user to coincide with the placement, wiring and programming of the NGN elements or for any selected time of day;
  reductions in conversion risk and installation skill requirements;
  line testing and optionally migration in real time so long as the line is not in use by the subscriber at initiation of the test and migration period (approximately 7 seconds);
  temporary bypass and automatic re-test of an entry (i.e., telephone number, line, etc.) of a Work Order after completion of other entries when a selected line is in use (i.e., busy), an entry can be retried a predetermined number of times, for example two (2);
  line testing only or line testing and migration as selected by the end user;
  electronic progress reports for administrators and end users; and
  enhanced security due to apparatus control and physical placement.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method comprising:
   accessing a telephone line for a telephone number through a metallic test access circuit of an analog network element;
   determining if the telephone line is available to test;
   if the telephone line is available to test, activating a port of a Next Generation Network element corresponding to the telephone number; and
   determining whether a copper connection to the port of the Next Generation Network element is operating properly based on a voltage level received through the analog network element.

2. The method of claim 1 further comprising:
   determining the telephone number for a telephone line to be tested.

3. The method of claim 1 further comprising:
   extracting the telephone number from a work order.

4. The method of claim 1 wherein accessing a telephone line for a telephone number through a metallic test access circuit comprises:
   instructing the metallic test access circuit to enter bypass mode.

5. The method of claim 1 wherein determining if the telephone line is available to test comprises:
   detecting whether the telephone line has voice or tone frequencies thereon.

6. The method of claim 1 further comprising
   if the telephone line is not available to test, accessing a telephone line for a second telephone number through the metallic test access circuit of the analog network element.

7. The method of claim 1 further comprising:
   de-activating the telephone line of the analog network element if the copper connection is determined to be operating properly.

8. The method of claim 1 wherein the analog network element is a Class 5 switch.

9. The method of claim 1 further comprising:
   de-activating a port of a Digital Subscriber Line Access Multiplexer associated with the telephone line if the copper connection is determined to be operating properly.

10. The method of claim 1 wherein the Next Generation Network element is a Voice over Internet Protocol element.

11. The method of claim 1 further comprising:
    de-activating the port of the Next Generation Network element corresponding to the telephone number when the copper connection to the port of the Next Generation Network element is not operating properly.

12. An apparatus comprising:
    a metallic test access interface for accessing a telephone line for a telephone number through a metallic test access circuit of an analog network element, the analog network element serving an analog network;
    a detection module for determining if the telephone line is available to test;
    a first activation module for activating and de-activating a port of a Next Generation Network element corresponding to the telephone number; and
    an evaluation module for determining whether a copper connection between the port of the Next Generation Network element and the analog network is operating properly based on a voltage level received through the analog network element.

13. The apparatus of claim 12 further comprising:
    a selection module for determining the telephone number for a telephone line to be tested.

14. The apparatus of claim 12 further comprising:
    a selection module for extracting the telephone number from a work order.

15. The apparatus of claim 12 wherein the metallic test access interface is adapted to instruct the metallic test access circuit to enter bypass mode.

16. The apparatus of claim 12 wherein the detection module is adapted to detect whether the telephone line has voice or tone frequencies thereon.

17. The apparatus of claim 12 further comprising:
a second activation module adapted to de-activate the telephone line of the analog network element if the copper connection is determined to be operating properly.

18. The apparatus of claim 12 wherein the Next Generation Network element is a Voice over Internet Protocol element.

19. A system comprising:
an analog network element for serving a telephone number and a corresponding telephone line in an analog network;
a Next Generation Network element for serving the telephone number and the corresponding telephone line;
a copper connection between the corresponding telephone line and a port of the Next Generation Network element; and
a control element adapted to verify the copper connection by activating the port of the Next Generation Network element and determining whether the copper connection is operating properly based on a voltage level received through the analog network element.

20. The system of claim 19 wherein the control element is further adapted to
determine if the telephone line is available to test;
activate the port of the Next Generation Network element that corresponds to the telephone number if the telephone line is available to test; and
de-activate the analog network element if the copper connection is determined to be operating properly.

* * * * *